Oct. 6, 1959 J. W. JACOBS 2,907,426
COUPLING FOR TRANSMITTING TORQUES
Filed March 23, 1955 2 Sheets-Sheet 2

INVENTOR.
James W. Jacobs
BY R. R. Candor
His Attorney

United States Patent Office
2,907,426
Patented Oct. 6, 1959

2,907,426

COUPLING FOR TRANSMITTING TORQUES

James W. Jacobs, Dayton, Ohio, assignor to General Motors Corporation, Detroit, Mich., a corporation of Delaware Application March 23, 1955, Serial No. 496,131

4 Claims. (Cl. 192—40)

This invention relates to refrigerating apparatus, and more particularly to a combination compressor and clutch construction.

In designing refrigerant compressors for use in automobile air conditioning, it is important to conserve on space, cost, and weight without sacrificing strength and efficiency. It is an object of this invention to so construct and arrange the parts of a combination compressor and clutch that it is possible to support the compressor pulley and parts of the clutch directly on the compressor shaft without causing undue strain on the shaft.

Another object of this invention is to provide a combination compressor and magnetic clutch wherein the air gap of the magnetic clutch and the compressor head clearance can be adjusted in a simple and practical manner.

It is another object of this invention to provide a combination magnetic clutch and axial compressor wherein it is possible to adjust the clutch air gap clearance without disturbing the compressor head clearance adjustment.

Still another object of this invention is to reduce the severity of the shock on the clutch and associated parts by using plastic clutch operating cams or balls for spreading the clutch plates.

Further objects and advantages of the present invention will be apparent from the following description, reference being had to the accompanying drawings, wherein a preferred form of the present invention is clearly shown.

Figure 1:
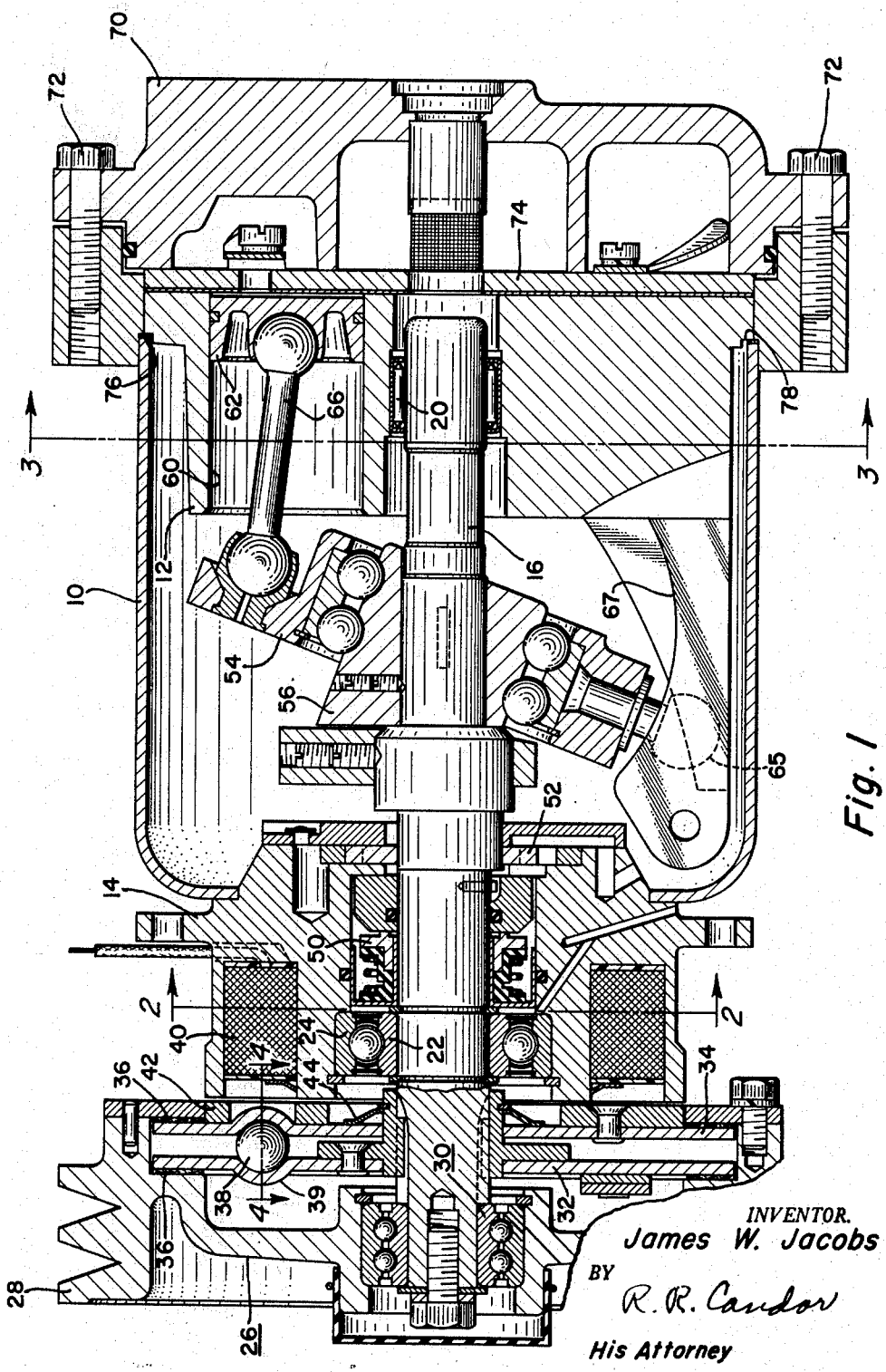
Figure 1 is a vertical sectional view taken substantially on line 1—1 of Figure 3, showing a preferred embodiment of the invention.
Figure 3:
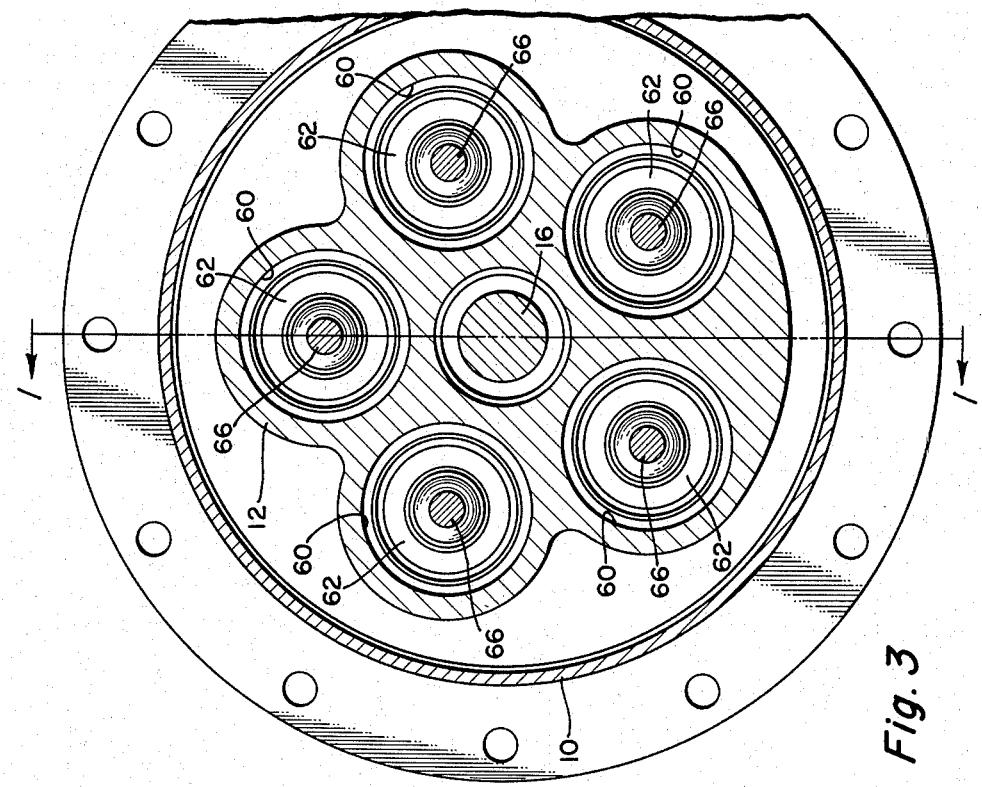
Figure 3 is a sectional view taken substantially on line 3—3 of Figure 1.
Figure 2:
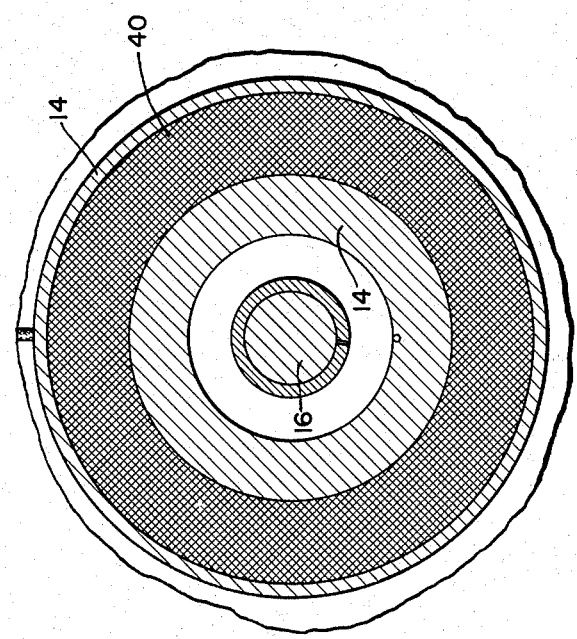
Figure 2 is a sectional view taken substantially on the line 2—2 of Figure 1 and looking in the direction of the arrows.
Figure 4:
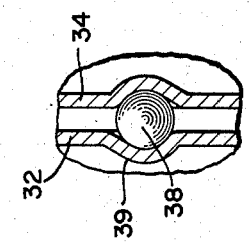
Figure 4 is a sectional view taken substantially on line 4—4 of Figure 1.

Referring now to the drawing wherein a preferred embodiment of the invention has been shown, reference numeral 10 designates a cylindrical sheet metal compressor casing which is closed at its one end by a cast cylinder block and bearing supporting element 12 and is closed at its other end by a casting 14 which houses the main shaft bearing 24 and the clutch operating solenoid coil 40. The casting 14 is brazed or otherwise secured to the casing 10. The main compressor drive shaft 16 is supported at its inner end within the cylinder block 12 by means of a needle bearing assembly 20 which allows longitudinal movement of the shaft relative to the cylinder block for a purpose to be described more fully hereinafter. The shaft 16 is supported adjacent its outer end by means of a ball bearing assembly which includes an inner ball race 22 keyed to the shaft 16 so as to prevent endwise movement of the shaft relative to the bearing assembly. The ball bearing assembly includes an outer ball race 24 which is keyed to the casting 14 whereby the drive shaft 16 is prevented from having any endwise movement relative to the casting 14.

The free end of the drive shaft 16 serves to support a drive pulley assembly generally designated by the reference numeral 26. This assembly includes a pulley element 28 which is supported for free rotation relative to the shaft by means of a ball bearing assembly 30. As indicated in Figure 1 of the drawing, the inner race of the ball bearing assembly is fixed to the drive shaft 16 and the outer race is fixed to the pulley 28. A first clutch disc 32 is splined to the shaft 16 so as to at all times rotate in unison with the shaft 16 and a second clutch plate 34 is rotatably mounted on the hub portion of the first clutch plate 32 as shown. The clutch plates are provided with the usual friction surfaces 36 for engaging complementary friction surfaces provided on the pulley assembly 26. The clutch is of the type more fully shown and described in my co-pending application S.N. 418,931, filed March 26, 1954, now Patent No. 2,866,528, dated December 30, 1958, to which reference is hereby made for a more complete description of the construction and operation of the clutch. The clutch includes the usual relative rotation reaction spreader ball means 38 which serve to cam the discs 32 and 34 into clutching engagement with the clutch surfaces 36 in response to energization of the solenoid coil 40 which is imbedded within the main casting 14 as shown.

The spreader ball means shown in my earlier filed application were steel ball bearings whereas I have found that steel ball bearings are very hard on the spreader plates and eventually cause failure of the clutch. For one thing the centrifugal force acting on the metal balls caused the balls to distort the shape of the ball socket 39 after prolonged use. To overcome these problems and to reduce the severity of the impact on the clutch parts, the balls are made of plastic such as nylon which is a polyamide material which is a reaction product of a polybasic acid such as adipic acid with a diamine such as hexamethylene diamine. The nylon material has resistance to permanent deformation and requires no fluid or grease like lubricant which might travel by centrifugal force outwardly onto the clutch surfaces. The spreader balls could have a solid type lubricant such as graphite or molybdenum disulfide incorporated as a filler in the plastic composition. Nylon balls having a Rockwell hardness of approximately R118 have been found to be very satisfactory and to have the necessary toughness to resist fracture or crushing. The nylon is a thermoplastic material which can withstand normal temperatures without undue softening or loss of strength, but it has a relatively sharp melting point whereby the balls serve as protective devices which melt at excessive temperatures such as would be encountered if for any reason the clutch became greatly overloaded and began slipping and thereby generating heat. When using clutches having metal spreader balls, the continued slipping of the clutch in the combination shown would not only generate enough heat to ruin the friction material at the clutch surfaces but would also generate enough heat so that some of the heat generated would be conducted to the compressor shaft, the shaft seal and other parts which would be damaged by excessive heat. In the structure shown herein the nylon balls are closest to the friction surfaces of the clutch so that in the event of clutch slippage the heat generated thereby would melt the balls and declutch the clutch before much of the heat would reach the vital parts of the compressor.

The clutch plate 34 is provided with an armature 42 which is attracted by the solenoid 40 whenever the solenoid is energized so as to cause the friction surface 36 on the plate 34 to engage the complementary friction surface on the pulley 28 and thereby initiate the necessary relative rotation between the clutch plate 32 and 34 so as to cause the spreader balls 38 to firmly hold the clutch surfaces in engagement in accordance with well known practice. Upon deenergization of the solenoid 40, the spring washer 44 will assist in disengaging the clutch so as to stop operation of the compressor even though the pulley 28 continues to rotate.

It will be observed that the main shaft bearing including the ball races 22 and 24 are arranged radially inwardly of the armature coil 40 with the result that the bearing for the main drive shaft may be placed very close to the end of the drive shaft 16. This construction has the advantage that it reduces the size of the assembly and also eliminates the need for a long overhang on the compressor shaft which must support the weight of the relatively heavy drive pulley and some of the clutch parts. The casting 14 serves to house the usual shaft seal assembly 50 and oil pump 52. The compressor is of the axial type which includes a wobble plate 54 mounted on the offset crank portion 56 which is keyed to the shaft 16 as shown. The cylinder element 12 is provided with a plurality of spaced cylinder bores 60 in which piston elements 62 are caused to reciprocate by means of connecting rods 66 operated by the wobble plate 54 in accordance with well known practice. The wobble plate is prevented from rotating by means of the guide shoe 65 which operates within the usual guides 67 formed integrally with the casting 12.

The usual cylinder head assembly generally designated by the reference character 70 is bolted to the casing 10 by means of the cap screws 72. In order to provide the necessary clearance between the pistons and the valve plate 74 there is provision for introducing shims 76 between the end of the casing 10, and the shoulder 78 provided on the cylinder casting 12. Since the construction of the wobble plate and the inlet and outlet ports are of conventional design, it is not believed necessary to describe these in greater detail.

While the form of embodiment of the invention as herein disclosed constitutes a preferred form, it is to be understood that other forms might be adopted, as may come within the scope of the claims which follow.

What is claimed is as follows:

1. In combination, a drive member, a driven member, clutch means for transmitting power from said drive member to said driven member, said clutch means comprising a pair of clutch plates drivingly connected to one of said members and clutch engaging means on the other of said members, means for supporting said plates for rotation about a common axis and for relative axial movement, and spreader means between said clutch plates energized by relative rotation of said plates for controlling the engagement of said clutch plates with said clutch engaging means, said spreader means comprising thermoplastic material fusible at temperatures above a predetermined value.

2. In a clutch mechanism, a main housing, a drive shaft, a bearing block secured to said housing and having its one face projecting outwardly through said housing, bearing means disposed within said bearing block, a drive pulley rotatably supported on said drive shaft, clutch means for transmitting power from said pulley to said drive shaft, said clutch means including a solenoid coil disposed within said bearing block and an armature carried by said pulley, a pair of clutch plates supported for axial movement relative to said shaft, and spreader means between said clutch plates for holding said clutch plates in driving engagement with said pulley in response to energization of said solenoid, said spreader means comprising thermoplastic elements fusible at temperatures above a predetermined value whereby said shaft is declutched from said pulley at temperatures above said value.

3. In a clutch mechanism, a main housing, a drive shaft, a bearing block secured to said housing and having its one face projecting outwardly through said housing, bearing means disposed within said bearing block, a drive pulley rotatably supported on said drive shaft, clutch means for transmitting power from said pulley to said drive shaft, said clutch means including a solenoid coil disposed within said bearing block and an armature carried by said pulley, a pair of clutch plates supported for axial movement relative to said shaft, spreader means between said clutch plates for holding said clutch plates in driving engagement with said pulley in response to energization of said solenoid, said spreader means comprising thermoplastic elements fusible at temperatures above a predetermined value whereby said shaft is declutched from said pulley at temperatures above said value, and a shaft seal supported by said bearing block in sufficiently close proximity to said clutch plates to be heated thereby at abnormally high clutch plate temperatures.

4. In combination, a drive member, a driven member, clutch means for transmitting power from said drive member to said driven member, said clutch means comprising a pair of clutch plates drivingly connected to one of said members and clutch engaging means on the other of said members, means for supporting said plates for rotation about a common axis and for relative axial movement, said clutch plates having inclined recesses formed in adjacent faces thereof, and spreader means between said clutch plates disposed in said recesses energized by relative rotation of said plates for wedging said plates apart and thereby controlling the engagement of said clutch plates with said clutch engaging means, said spreader means comprising graphite impregnated plastic balls.

References Cited in the file of this patent

UNITED STATES PATENTS

| | | |
|---|---|---|
| 2,037,961 | Boden | Apr. 21, 1936 |
| 2,140,723 | Spicer | Dec. 20, 1938 |
| 2,214,391 | Weydell | Sept. 10, 1940 |
| 2,232,984 | Wahlmark | Feb. 25, 1941 |
| 2,314,227 | Lieberherr | Mar. 16, 1943 |
| 2,344,864 | Griswold | Mar. 21, 1944 |
| 2,609,256 | Baker | Sept. 2, 1952 |
| 2,614,396 | Ratermann | Oct. 21, 1952 |
| 2,658,593 | Doebeli | Nov. 10, 1953 |
| 2,711,292 | Taggart et al. | June 21, 1955 |
| 2,737,055 | Douben | Mar. 6, 1956 |
| 2,801,719 | Clerk | Aug. 6, 1957 |
| 2,803,140 | Olley | Aug. 20, 1957 |
| 2,807,148 | Jacobs | Sept. 24, 1957 |
| 2,816,636 | Weibel | Dec. 17, 1957 |